United States Patent [19]

Asaoka et al.

[11] Patent Number: 5,419,931
[45] Date of Patent: May 30, 1995

[54] LIQUID CRYSTAL DEVICE

[75] Inventors: Masanobu Asaoka, Yokohama; Hideaki Takao, Sagamihara; Takeshi Togano, Yokohama; Makoto Kojima, Tokyo, all of Japan

[73] Assignee: Canon Kabushiki Kaisha, Tokyo, Japan

[21] Appl. No.: 122,936

[22] Filed: Sep. 20, 1993

[30] Foreign Application Priority Data

Dec. 14, 1992 [JP] Japan ................................ 4-352913
Sep. 18, 1993 [JP] Japan ................................ 4-273574
Sep. 18, 1993 [JP] Japan ................................ 4-273576

[51] Int. Cl.$^6$ ........................................... G02F 1/1337
[52] U.S. Cl. ........................................ 428/1; 359/75
[58] Field of Search ....................... 428/1; 359/75, 78

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 5,129,727 | 7/1992 | Hanyu et al. | 359/75 |
| 5,192,596 | 3/1993 | Hanyu et al. | 428/1 |
| 5,250,330 | 10/1993 | Asaoka | 428/1 |

FOREIGN PATENT DOCUMENTS

| | | | |
|---|---|---|---|
| 107216 | 8/1981 | Japan . | |
| 37621 | 3/1983 | Japan | 359/75 |
| 25418 | 2/1991 | Japan . | |

*Primary Examiner*—Alexander S. Thomas
*Attorney, Agent, or Firm*—Fitzpatrick, Cella, Harper & Scinto

[57] ABSTRACT

A liquid crystal device is constituted by disposing a liquid crystal between a pair of substrates; at least one of which has thereon an alignment film comprising a polymer selected from Polymers (I)–(III) below:

Polymer (I) which is a polymer composite comprising at least two polymer components including a polyamide represented by a structural unit of the following formula (1):

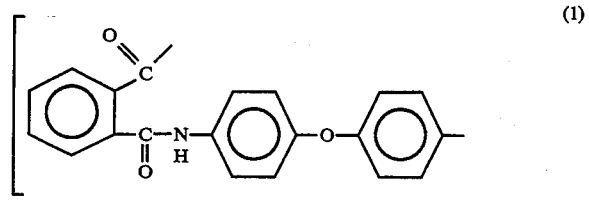

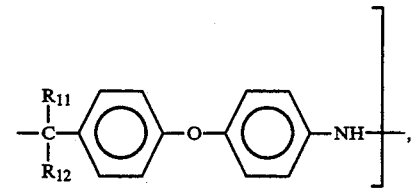

wherein $R_{11}$ and $R_{12}$ independently denote an alkyl group having 1–10 carbon atoms or a fluoroalkyl group having 1–10 carbon atoms;

Polymer (II) which is a composite polyamide having at least two species of dicarboxylic acid-originated units each represented by formula (2) below:

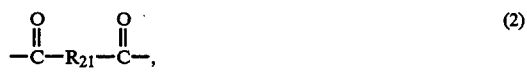

wherein $R_{21}$ denotes a divalent organic residue group including an aromatic ring; and a diamine-originated unit represented by formula (3) below:

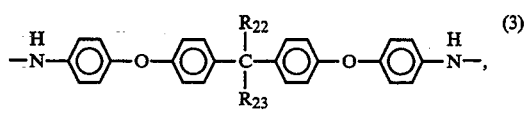

wherein $R_{22}$ and $R_{23}$ independently denote an alkyl group having 1–10 carbon atoms, with the proviso that at least one species of the dicarboxylic acid originated units is one having a straight molecular structure; and Polymer (III) which is a polyamide composite comprising at least two polyamides formed from an aromatic (Abstract continued on next page.)

ring-containing acid component and a diamine component represented by formula (4) below:
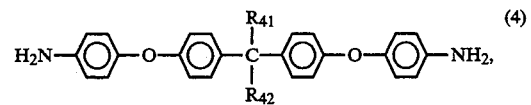
wherein $R_{41}$ and $R_{42}$ independently denote an alkyl group having 1–10 carbon atoms.
12 Claims, 6 Drawing Sheets

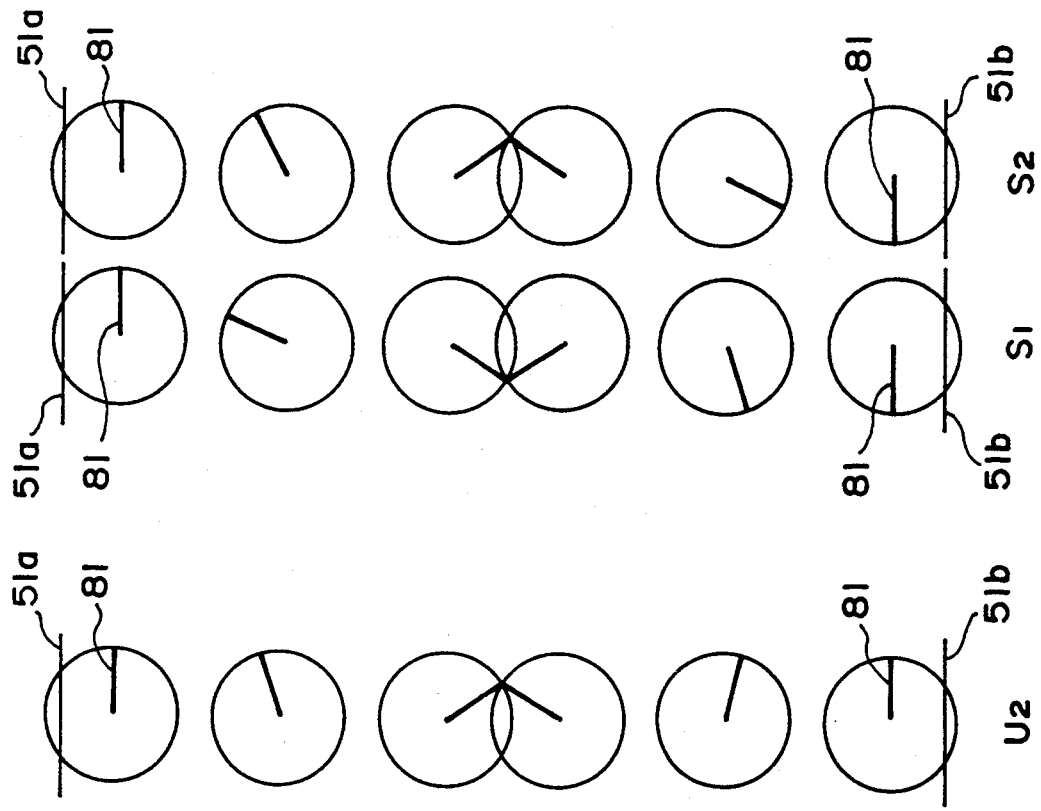
FIG. 6
FIG. 5
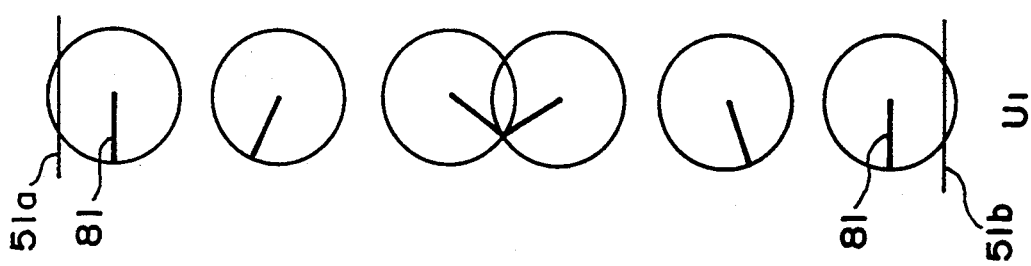
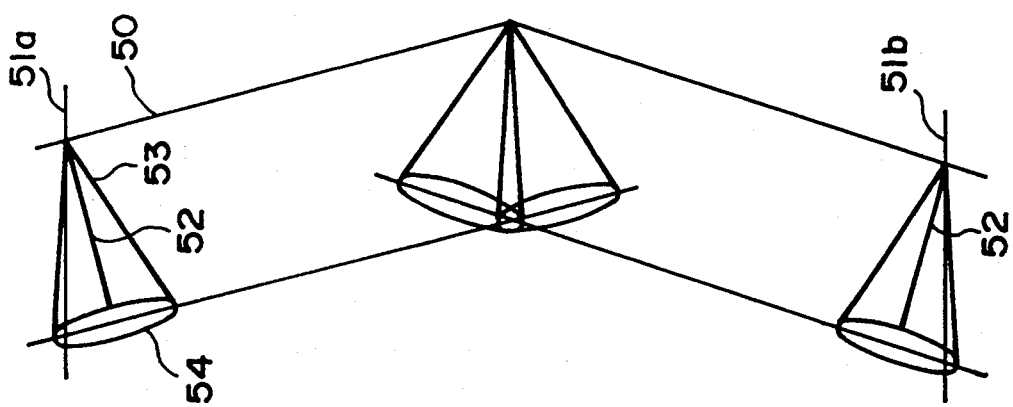
FIG. 4

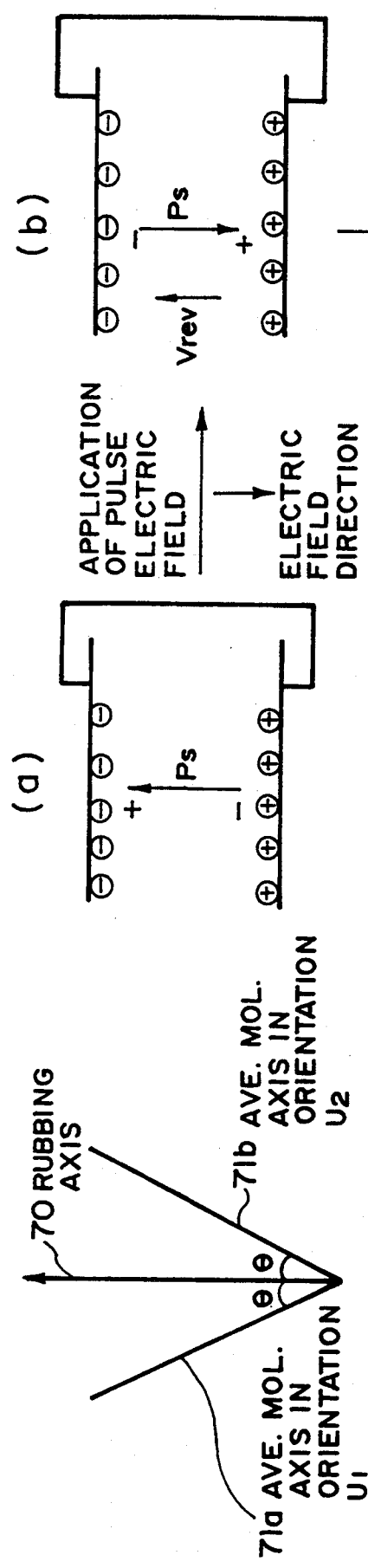
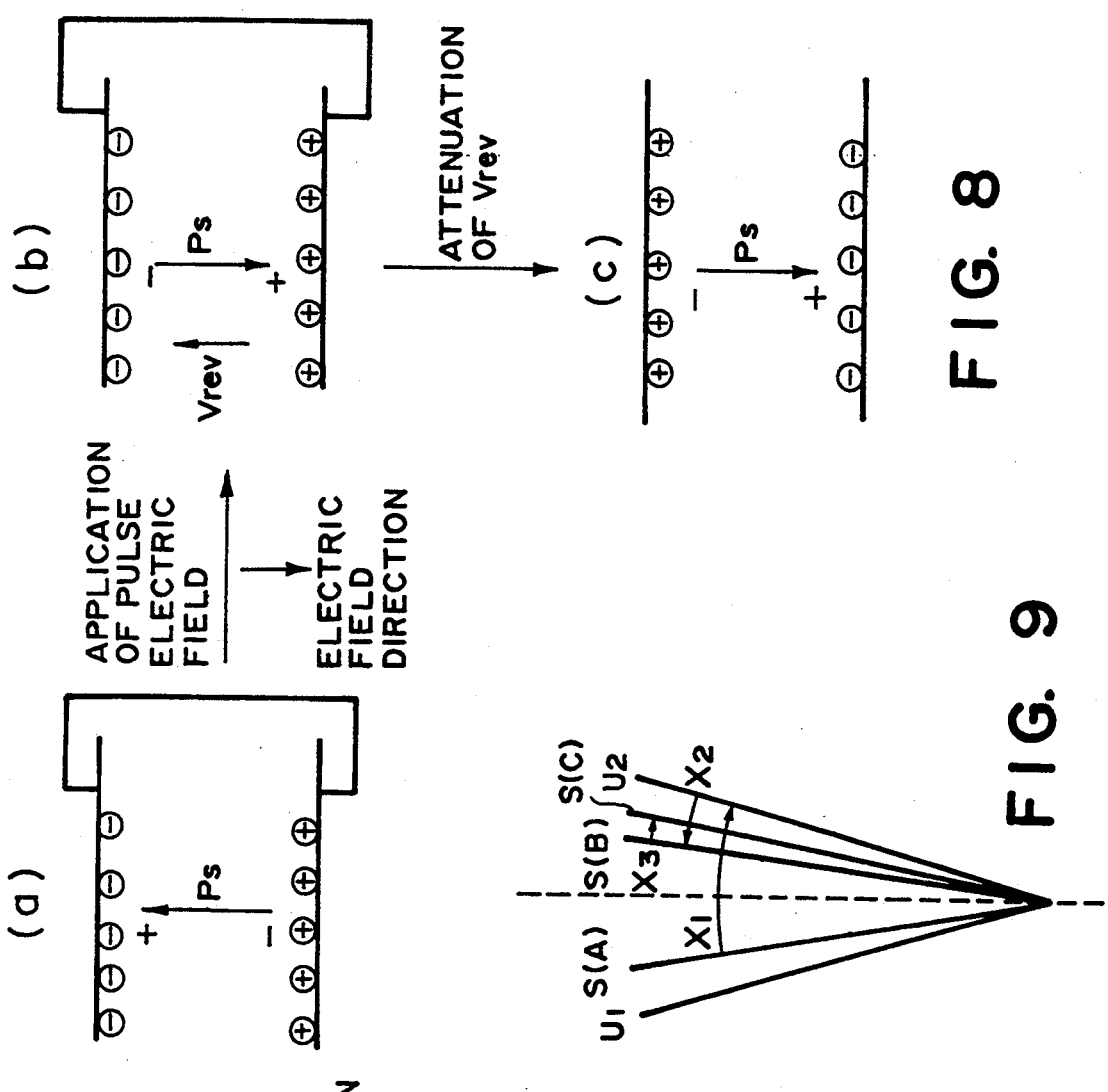
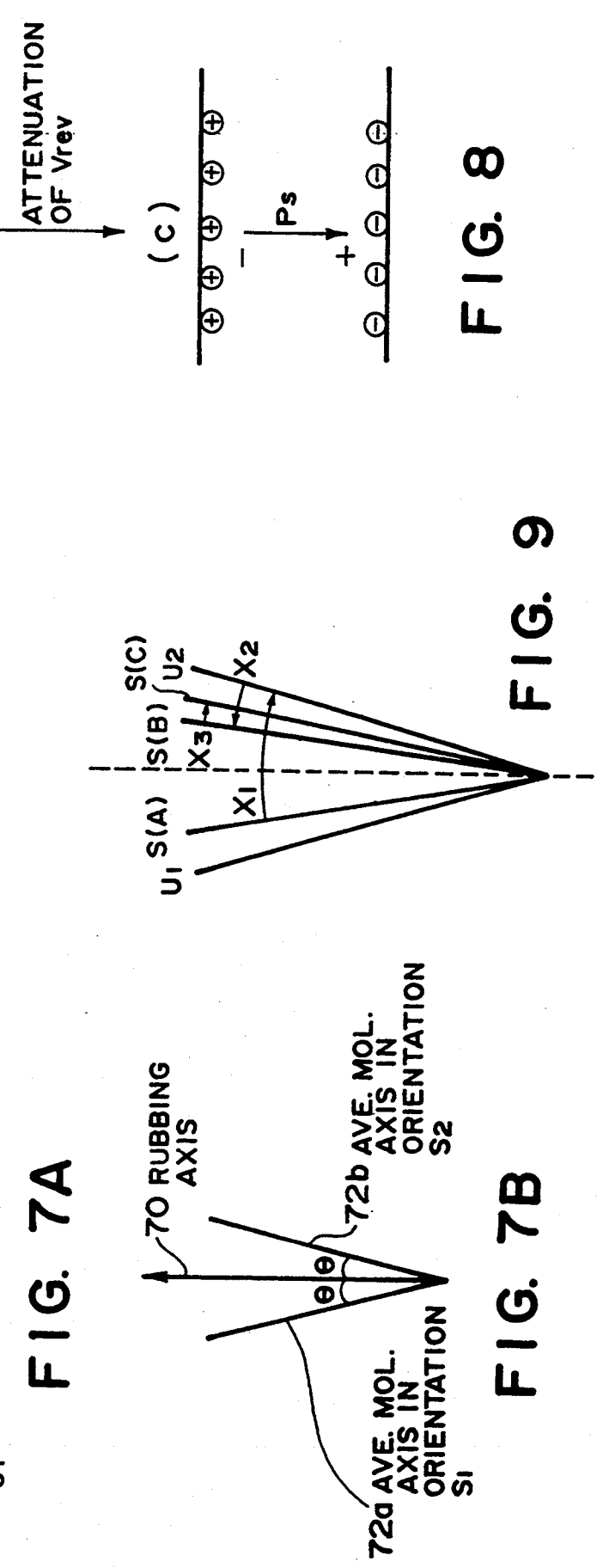
FIG. 7A
FIG. 7B
FIG. 8
FIG. 9

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, in the SmC* or SmH, phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein $I_0$: incident light intensity,
I: transmitted light intensity,
$\theta$: tilt angle,
$\Delta n$: refractive index anisotropy,
d: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle Ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

In view of the above-mentioned problems, our research groups has already proposed a new type of polyimide alignment film (Japanese Laid-Open Patent Application (JP-A) 3-25418). In the resultant alignment state, however, there are present a high contrast state (uniform alignment) and a low contrast state (splay alignment). When multiplexing drive is effected in this state, there occurs the splay alignment at an upper limit and a lower limit of a drive range for writing in the high contrast state. This tendency becomes noticeable in the case of a large display area, or when the panel is accompanied with an irregularity of aligning treatment or when the driving waveform is corrupted or deformed. As a result, the range of the uniform alignment is narrowed.

SUMMARY OF THE INVENTION

Accordingly, an object of the present invention is to provide a liquid crystal device having solved the above-mentioned problems, particularly a liquid crystal device which provides a large tilt angle of a chiral smectic liquid crystal in a non-helical structure and provides a display capable of stably displaying a high-contrast image even in a large area and yet free from after-image.

Through experiments, we have discovered that the above-mentioned problems can be solved by a liquid crystal device having characteristics as described below.

More specifically, according to the present invention, there is provided a liquid crystal device, comprising: a pair of substrates and a liquid crystal disposed between the substrates; at least one of said pair of substrates having thereon an alignment film comprising a polymer selected from Polymers (I)–(III) below:

Polymer (I) which is a polymer composite comprising at least two polymer components including a polyamide represented by a structural unit of the following formula (1):

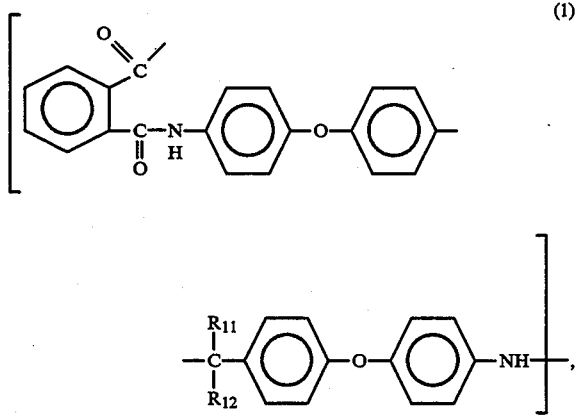

wherein $R_{11}$ and $R_{12}$ independently denote an alkyl group having 1–10 carbon atoms or a fluoroalkyl group having 1–10 carbon atoms;

Polymer (II) which is a composite polyamide having at least two species of dicarboxylic acid-originated units each represented by formula (2) below:

wherein $R_{21}$ denotes a divalent organic residue group including an aromatic ring; and a diamine-originated unit represented by formula (3) below:

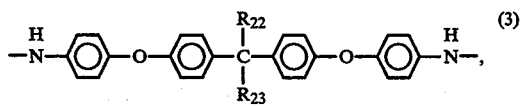

wherein $R_{22}$ and $R_{23}$ independently denote an alkyl group having 1–10 carbon atoms, with the proviso that at least one species of the dicarboxylic acid originated units is one having a straight molecular structure; and Polymer (III) which is a polyamide composite comprising at least two polyamides formed from an aromatic ring-containing acid component and a diamine component represented by formula (4) below:

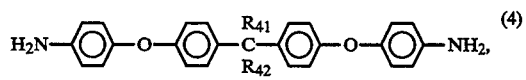

wherein $R_{41}$ and $R_{42}$ independently denote an alkyl group having 1–10 carbon atoms.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing an alignment state of a chiral smectic liquid crystal aligned according to the present invention.

FIG. 5 is an illustration of C-director alignments in a uniform alignment state.

FIG. 6 is an illustration of C-director alignments in a splay alignment state.

FIGS. 7A and 7B are plan views illustrating tilt angles $\theta$ in a uniform alignment state and a splay alignment state, respectively.

FIG. 8 is a sectional view showing a charge distribution, a direction of a spontaneous polarization $P_S$ and a direction of a reverse electric field Vrev.

FIG. 9 is a schematic plan view illustrating changes in tilt angle $\theta$ during and after application of an electric field.

DETAILED DESCRIPTION OF THE INVENTION

Figure 1:
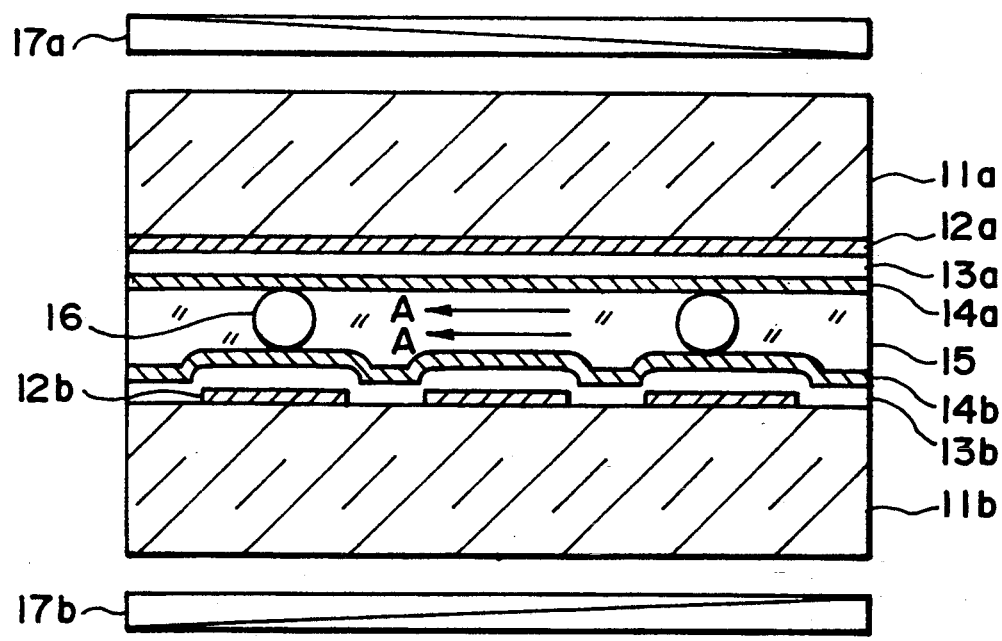
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200–1000 Å-thick insulating films 13a of $SiO_2$, $TiO_2$, $Ta_2O_5$, etc., and 50–1000 Å-thick alignment control films 14a and 14b.

In this instance, the alignment control films 14a and 14b have been treated by rubbing, as a uniaxial aligning treatment, in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The thus formed cell structure is sandwiched between a pair of polarizers 17a and 17b arranged in cross nicols.

In the present invention, it is also possible to dispose the rubbing directions provided to a pair of substrates to be parallel and opposite to each other or crossing each other at an intersection angle of 2–30 degrees.

According to our experiments, by using an alignment method using a specific polymer composite alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

According to the present invention, at least one of the alignment films 14a and 14b is constituted by a polymer selected from Polymers (I)–(III) below:

Polymer (I) is a polymer composite comprising at least two polymer components including a polyamide represented by a structural unit of the formula (1) described above.

Another polymer component may preferably be a polyamide, a polyimide or a polyamideimide.

The dicarboxylic acid component constituting the polyamide in Polymer (I) according to the present invention may be a dicarboxylic acid ordinarily used for producing polyamides. Preferred examples thereof may include terephthalic acid, isophthalic acid, 4,4'-biphenyldicarboxylic acid, 1,5-naphthalenedicarboxylic acid, 2,3-naphthalenedicarboxylic acid, 1,8-naphthalenedicarboxylic acid, 2,6-naphthalenedicarboxylic acid, and 4,4''-terphenyldicarboxylic acid.

The tetracarboxylic acid component constituting the polyamide in Polymer (I) according to the present invention may be a tetracarboxylic dianhydride ordinarily used for producing polyimides. Preferred examples thereof may include pyrommelitic dianhydride, 3,3',4,4'-biphenyltetracarboxylic dianhydride, 2,3,3',4'-biphenyltetracarboxylic dianhydride, 2,3,6,7-anthracenetetracarboxylic dianhydride, 3,3'',4,4''-terphenyltetracarboxylic dianhydride, 1,4,5,8-naphthalenetetracarboxylic dianhydride, and 2,3,6,7-naphthalenetetracarboxylic dianhydride.

The acid component for constituting the polyamideimide in Polymer (I) according to the present invention may for example be trimellitic anhydride.

The diamine component for constituting the polyimide, polyamide and polyamideimide in Polymer (I) may be selected from common ones.

Specific examples of the diamine component may include: 2,2-bis(4-aminophenoxyphenyl)propane, 3,3-bis(4-aminophenoxyphenyl)pentane, 4,4-bis(4-aminophenoxyphenyl)heptane, 5,5-bis(4-aminophenoxyphenyl)nonane, 2,2-bis(4-aminophenoxyphenyl)butane, 2,2-bis(4-aminophenoxyphenyl)pentane, 2,2-bis(4-aminophenoxyphenyl)hexane, 3,3-bis(4-aminophenoxyphenyl)hexane, 3,3-bis(4-aminophenoxyphenyl)heptane, 4,4-bis(4-aminophenoxyphenyl)octane, 2,2-bis(4-aminophenoxyphenyl)-3-methylbutane, 2,2-bis(4-aminophenoxyphenyl)-4-methylpentane, 2,2-bis(4-aminophenoxyphenyl)-5-methylhexane, 3,3-bis(4-aminophenoxyphenyl)-2-methylpropane, 2,2-bis(4-aminophenoxyphenyl)-hexafluoropropane, and 2,2-bis(4-aminophenoxyphenyl)-dicylofluoropentane.

The acid component and diamine component may preferably be reacted in substantially equal mols.

Polymer (I) may preferably have a number-average molecular weight of, e.g., $5 \times 10^3 - 10^5$, preferably $2 \times 10^4 - 8 \times 10^4$.

Polymer (I) may be a mixture of the polymer components or a copolymer between the polymer components.

The polyamide represented by the structural unit (1) in Polymer (I) may preferably occupy 0.01–80 wt. %, preferably 10–50 wt. %, of the total polymer composite. A larger portion thereof in excess of 80 wt. % can result in a rather inferior alignment characteristic.

Polymer (II) is a composite polyamide comprising at least two species of polyamides including at least two species of dicarboxylic acid-originated units represented by the above-mentioned structural formula (2) and a diamine originated-unit represented by the structural formula (3) with the proviso that at least one species of $R_{21}$ in the structural formula (2) has a straight molecular structure.

Examples of the divalent organic residue group $R_{21}$ having a straight molecular (or straight substituted aromatic ring structure) may include:

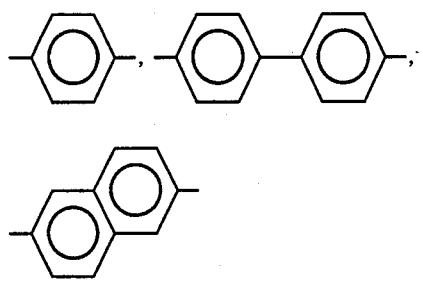

On the other hand, examples of the divalent organic residue group having a non-straight molecular structure may include:

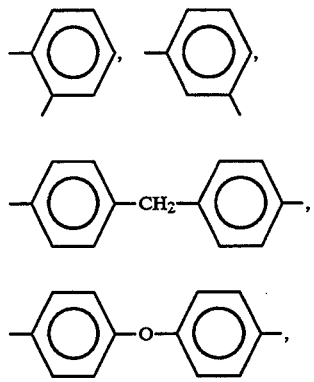

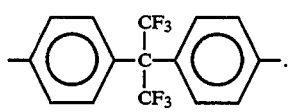

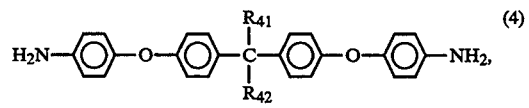 (4)

Polymer (II) may be obtained by subjecting to dicarboxylic acids and a diamine as described below.

Examples of the dicarboxylic acid having a straight molecular structure may include: terephthalic acid, 4,4'-biphenyldicarboxylic acid, and 2,6-naphthalenedicarboxylic acid.

Examples of the dicarboxylic acid having a non-straight molecular structure may include: orthophthalic acid, isophthalic acid, 4,4'-dicarboxydiphenylmethane, 4,4'-dicarboxy-diphenyl ether, and 2,2-bis(4-carboxyphenyl)hexafluoropropane.

Further, specific examples of the diamine component may include: 2,2-bis(4-aminophenoxyphenyl)propane, 3,3-bis(4-aminophenoxyphenyl)pentane, 4,4-bis(4-aminophenoxyphenyl)heptane, 5,5-bis(4-aminophenoxyphenyl)nonane, 2,2-bis(4-aminophenoxyphenyl)butane, 2,2-bis(4-aminophenoxyphenyl)pentane, 2,2-bis(4-aminophenoxyphenyl)hexane, 3,3-bis (4-aminophenoxyphenyl)hexane, 3,3-bis(4-aminophenoxyphenyl)heptane, 4,4-bis(4-aminophenoxyphenyl)octane, 2,2-bis(4-aminophenoxyphenyl)-3-methylbutane, 2,2-bis(4-aminophenoxyphenyl)-4-methylpentane, 2,2-bis(4-aminophenoxyphenyl)-5-methylhexane, and 3,3-bis(4-aminophenoxyphenyl)-2-methylpropane.

In case where an alignment film of an ordinary single polyamide, it is difficult to align a liquid crystal so as to provide average molecular axes showing a tilt angle which is close to the largest tilt angle as will be described hereinafter. Further, it is generally difficult to obtain preferred characteristics by an ordinary composite of single polyamides. According to the present invention, however, a large tilt angle has been obtained by an alignment film of Polymer (II), i.e., a specific polyamide composite comprising a combination of at least two polyamides formed from structural units (2) and (3) with the proviso that at least one of the structural units (2) has a straight molecular structure.

The composite polyamide constituting Polymer (II) may be obtained by combining the at least two polyamides by way of blending (or mixing), compopolymerization, lamination of at least two layers of unit polyamide films, etc., in appropriate proportions, so that each polyamide constitutes 0.01–80 wt. %, preferably 10–50 wt. %, of the resultant composite polyamide.

Polymer (III) is a polyamide composite comprising at least two polyamides formed from an aromatic ring-containing acid component and a diamine component of the above-mentioned formula (4).

Examples of the aromatic ring-containing acid group may include: terephthalic acid, 4,4'-biphenyldicarboxylic acid, 2,6-naphthalenedicarboxylic acid, isophthalic acid, 4,4'-dicarboxy-diphenylmethane, 4,4'-dicarboxy-diphenyl ether, and 2,2-bis(4-carboxyphenyl)hexafluoropropane. Among these, those having a straight molecular structure, such as terephthalic acid, 4,4'-biphenyldicarboxylic acid, and 2,6-naphthalenedicarboxylic acid, are preferred.

The diamine components constituting Polymer (III) are those represented by the following formula (4):

wherein $R_{41}$ and $R_{42}$ independently denote a linear or branched alkyl group having 1–10 carbon atoms, preferably 1–5 carbon atoms.

Specific examples of the diamine component may include: 2,2-bis(4-aminophenoxyphenyl)propane, 3,3-bis(4-aminophenoxyphenyl)pentane, 4,4-bis(4-aminophenoxyphenyl)heptane, 5,5-bis(4-aminophenoxyphenyl)nonane, 9,9-bis-(4-aminophenoxyphenyl)heptadicane, 2,2-bis(4-aminophenoxyphenyl)butane, 2,2-bis(4-aminophenoxyphenyl)pentane, 2,2-bis(4-aminophenoxyphenyl)hexane, 3,3-bis(4-aminophenoxyphenyl)hexane, 3,3-bis(4-aminophenoxyphenyl)heptane, 4,4-bis(4-aminophenoxyphenyl)octane, 2,2-bis(4-aminophenoxyphenyl)-3-methylbutane, 2,2-bis(4-aminophenoxyphenyl)-4-methylpentane, 2,2-bis(4-aminophenoxyphenyl)-5-methylhexane, and 3,3-bis(4-aminophenoxyphenyl)-2-methylpropane.

Polymer (III) may have a number-average molecular weight of $10^2$–$10^6$, preferably $10^4$–$10^5$.

In case where an alignment film of an ordinary single polyamide, it is difficult to align a liquid crystal so as to provide average molecular axes showing a tilt angle which is close to the largest tilt angle as will be described hereinafter. Further, it is generally difficult to obtain preferred characteristics by an ordinary composite of single polyamides. According to the present invention, however, a large tilt angle has been obtained by an alignment film of Polymer (III), i.e., a specific polyamide composite comprising a combination of at least two polyamides formed from an aromatic ring-containing acid component and a diamine component of the formula (4).

The composite polyamide constituting Polymer (III) may be obtained by combining the at least two polyamides by way of blending (or mixing), compopolymerization, lamination of at least two layers of unit polyamide films, etc., in appropriate proportions, so that each polyamide constitutes 0.01–80 wt. %, preferably 10–50 wt. %, of the resultant composite polyamide.

An alignment film of Polymer (I)–(III) may be formed on a substrate by forming a solution of the polymer components including a polyamide in a solvent, such as dimethylformamide, dimethylacetoamide, dimethylsulfoxide and N-methylpyrrolidone at a concentration of 0.01–40 wt. % and applying the solution onto the substrate by spinner coating, spray coating, roller coating, etc., followed by heating at 100°–250° C., preferably 150°–220° C., for evaporation of the solvent. The polyamide type alignment film of Polymer (I)–(III) thus formed may be rubbed with a cloth, etc., in one direction. In case where a pair of substrates are both provided with alignment films, the alignment films on both substrates may be rubbed in directions which are parallel and identical or opposite to each other or cross each other at an angle of 2–30 degrees.

The polyamide-type alignment film may be formed in a thickness of 30 Å – 1 μm, preferably 200 Å–2000 Å. In this case, the insulating films 13a and 13b shown in FIG. 1 can be omitted. In case where the alignment film 14a or 14b is formed on the insulating film 13a or 13b, the alignment film may be formed in a thickness of 200 Å or less, preferably 100 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range) is preferred. Preferred examples of such a liquid crystal material may include liquid crystal materials (1)–(5) below comprising the following liquid crystals [A], [B] and [C] in the indicated proportions by weight.

[A]

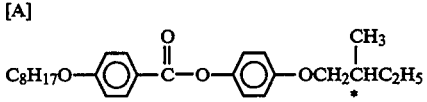

[B]

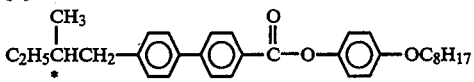

[C]

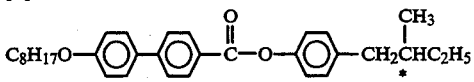

Liquid crystal material
(1) [A]$_{90}$/[B]$_{10}$
(2) [A]$_{80}$/[B]$_{20}$
(3) [A]$_{70}$/[B]$_{30}$
(4) [A]$_{60}$/[B]$_{40}$
(5) [C]

Figure 2:
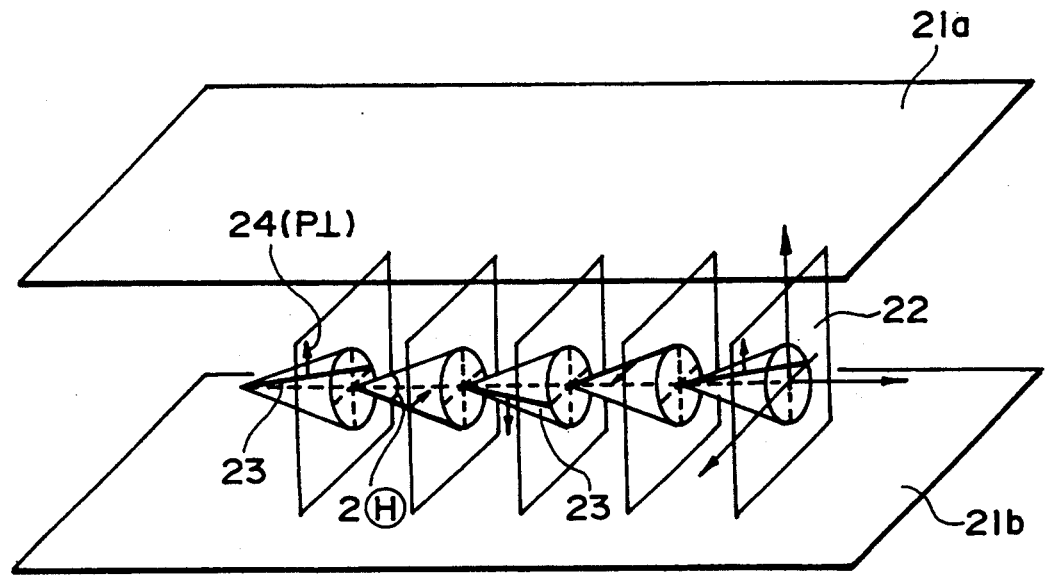
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle (H) in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
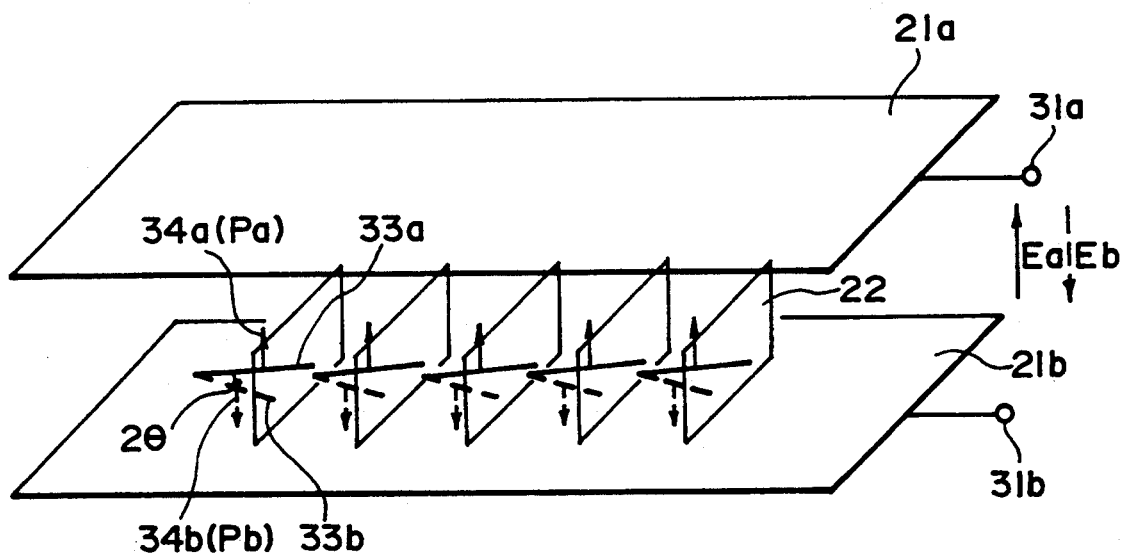
FIG. 3 is a perspective view showing schematically an alignment state of a chiral smectic liquid crystal having a non-helical structure.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at U$_1$ are shown C-directors 81 (each being a projection of a molecular long axis onto an imaginary plane perpendicular to the normal to a molecular layer 50) in one stable orientation state, and at U$_2$ are shown C-directors 81 in the other stable orientation state.

On the other hand, an alignment state attained by a conventional rubbing-treated polymer film may be represented by a C-director diagram of FIG. 6, which shows an alignment state wherein molecular axes are twisted in a large degree from the upper substrate 51a to the lower substrate 51b l to provide a smaller tilt angle θ.

FIG. 7A is a schematic plan view illustrating a tilt angle θ in an alignment state where C-directors 81 assume a state shown in FIG. 5 (referred to as "uniform alignment state"), and FIG. 7B is a schematic plan view illustrating a tilt angle θ in an alignment state where C-directors 81 assume a state shown in FIG. 6 (referred to as "splay alignment state"). In these figures, reference numeral 70 denotes a rubbing axis provided to the above-mentioned fluorine-containing polyimide film, numeral 71a denotes an average molecular axis in the orientation state $U_1$, numeral 71b denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained.

If the capacitance of an insulating layer constituting a liquid crystal cell is denoted by $C_i$, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(C_i + C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
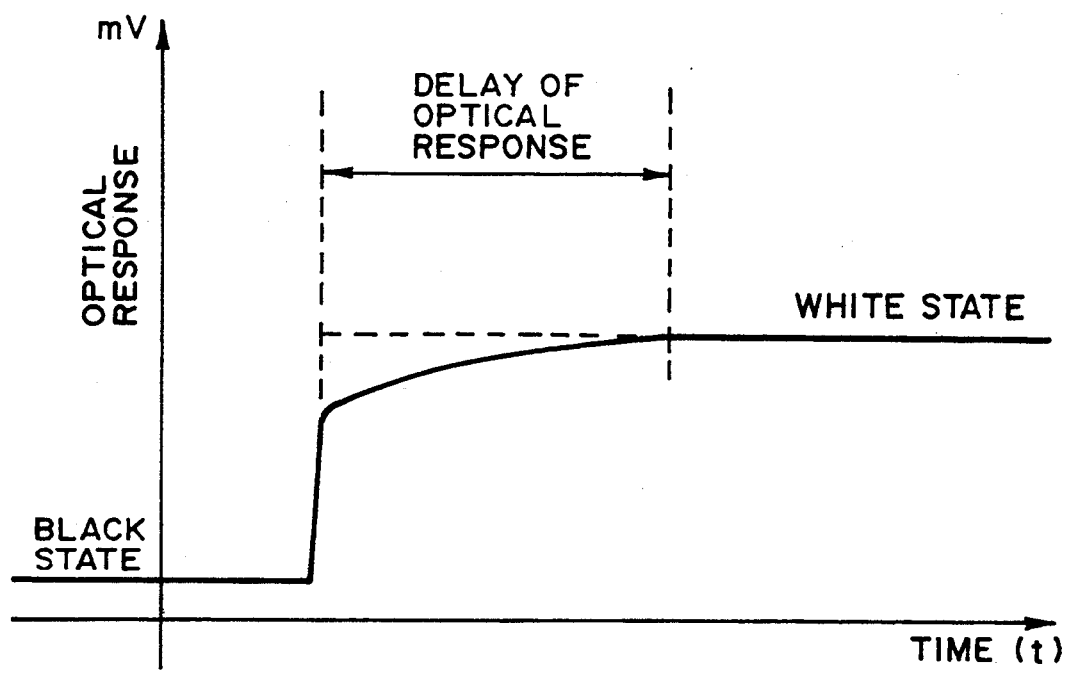
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle $\theta$. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle ⒽHalong a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle $\theta$. The resultant optical response in this case is shown in FIG. 10.

Figure 11:
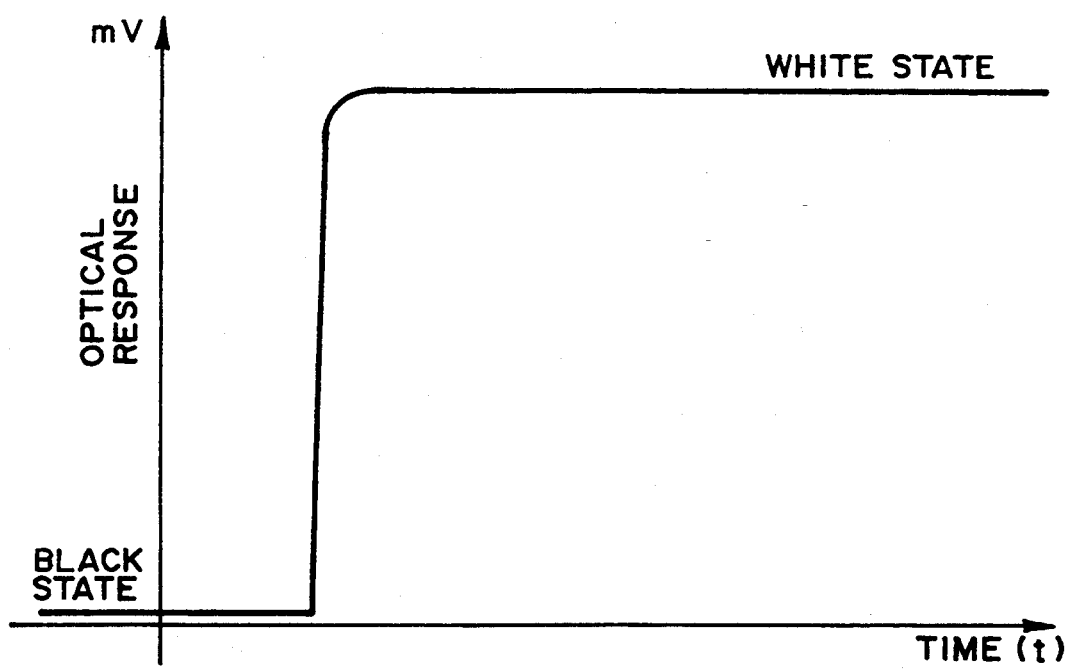

In the alignment state given by using the above-mentioned polyimide or polyamideimide film of the specific structure of the present invention, the average molecular axes S(A), S(B) and S(C) in the splay alignment state shown in FIG. 9 are not caused but it is possible to form an alignment state with an average molecular axis giving a tilt angle $\theta$ which is close to a maximum tilt angle Ⓗ. An optical response at this time according to the present invention is shown in FIG. 11. FIG. 11 shows that a delay in optical response causing after-image is obviated and a high contrast in memory states is caused.

More specifically, when the alignment film of the present invention is used, it is possible to provide the above-mentioned uniform alignment state.

Hereinbelow, the present invention will be explained based on Examples.

EXAMPLE 1

Two 1.1 mm-thick glass plates each in a size of 100 mm×100 mm and provided with a 1000 Å-thick ITO film were respectively coated with a 2.0 wt. % solution in a solvent mixture of N-methylpyrrolidone/n-butylcellosolve (=1/1) of a mixture including 25 wt. parts of a polyamide represented by structural formula (A) below and 75 wt. parts of a polyamide represented by formula (B) below having number-average molecular weights of $4\times10^4$ and $5\times10^3$, respectively as measured by gel permeation chromatography (GPC), by means of a spinner coater rotating at 3000 r.p.m. for 30 sec.

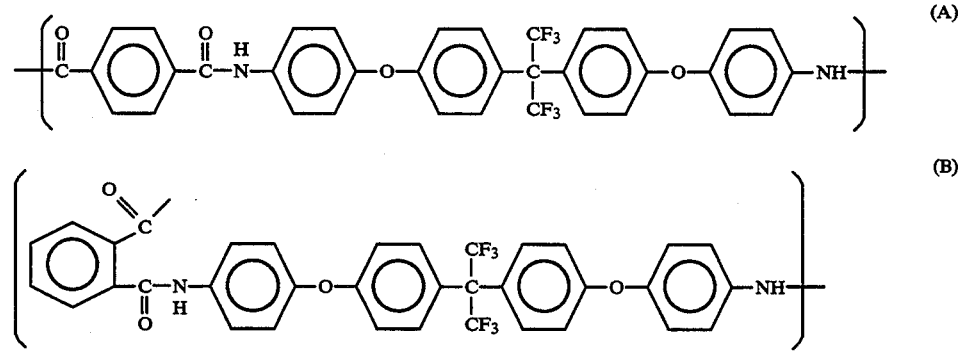

After the coating, the coating films were then baked at 250° C. for about 1 hour to form 250 Å-thick films, which were then rubbed with a nylon-planted cloth in one direction.

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a ferroelectric smectic liquid crystal ("CS-1014" (trade name), available from Chisso K. K.) under vacuum and, after sealing, was gradually cooled from isotropic phase at a rate of 5°

C./min. to 30° C., whereby an alignment was effected. The "CS-1014" liquid crystal in the cell showed the following phase transition series.

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle $\theta$=about 12 degrees, transmittance in the brightest state=32.0%, transmittance in the darkest state=1.2%, contrast ratio=27:1.

The delay in optical response causing after-image was at most 0.2 sec.

Figure 12:
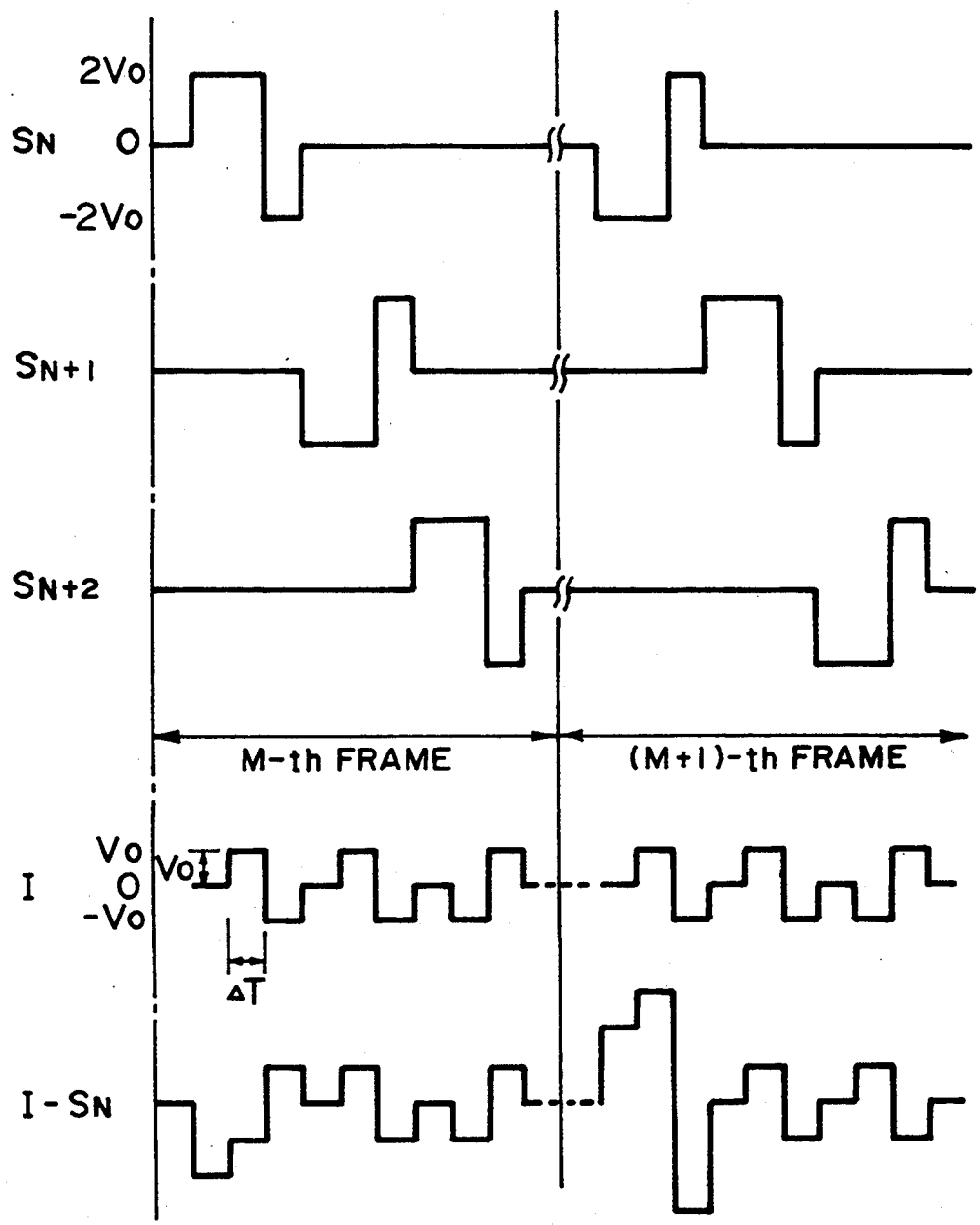
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and $\Delta T$=20–70 μsec.

EXAMPLES 2–7

Liquid crystal cells were prepared and evaluated in the same manner as in Example 1 except for the use of alignment films formed from polymer components (wherein polyamides of the structural formula (1) had a number-average molecular weight of about 5000 and the other polymers had a number-average molecular weight of $5 \times 10^4$, and liquid crystal materials shown in Table 1 below, wherein the numbers following the polymer components denote percentages by weight of the components in the total polymer.

The measured results of contrast ratio, delay in optical response, and evaluation of homogeneity of alignment are inclusively shown in Table 2 appearing hereinafter.

TABLE 1

| | Polymer components of alignment film | (wt. parts) | L.C. material |
|---|---|---|---|
| 2 | [structure] | 40 | "CS-1014" |
| | [structure] | 40 | |
| | Polyamide of formula (1) R₁ = CF₃ R₂ = CF₃ | 20 | |
| 3 | [structure] | 70 | "CS-1014" |
| | Polyamide of formula (1) R₁ = CF₃ R₂ = CF₃ | 30 | |
| 4 | [structure] | 85 | "CS-1014" |
| | Polyamide of formula (1) R₁ = C₄H₉ R₂ = C₄H₉ | 15 | |

TABLE 1-continued

| | Polymer components of alignment film | (wt. parts) | L.C. material |
|---|---|---|---|
| 5 | [structure: pyromellitic dianhydride-derived diimide with bisphenol-type diamine containing C$_4$H$_9$ and CH$_3$ groups] | 50 | "CS-1014" |
| | [structure: polyamide with CF$_3$ groups] | 25 | |
| | Polyamide of formula (1) R$_1$ = CF$_3$ R$_2$ = CF$_3$ | 25 | |
| 6 | [structure: polyamide with CF$_3$ groups] | 75 | Above-mentioned L.C. material (3) |
| | Polyamide of formula (1) R$_1$ = CF$_3$ R$_2$ = CF$_3$ | 25 | |
| 7 | [structure: naphthalene diimide with bisphenol containing CF$_3$ groups] | 70 | Above-mentioned L.C. material (3) |
| | Polyamide of formula (1) R$_1$ = CF$_3$ R$_2$ = CF$_3$ | 30 | |

TABLE 2

| Ex. | Contrast ratio | Optical delay time (sec) | Homogeneity in L.C. device* |
|---|---|---|---|
| 2 | 70:1 | 0.1 | ⊚ |
| 3 | 25:1 | 0.3 | ⊚ |
| 4 | 20:1 | 0.2 | ⊚ |
| 5 | 24:1 | 0.3 | ⊚ |
| 6 | 25:1 | 0.3 | ⊚ |
| 7 | 20:1 | 0.2 | ⊚ |

*: Evaluation standards
⊚: Homogeneous alignment during multiplexing drive.
○: Slight local alignment irregularity during multiplexing drive.
x: Alignment irregularity during multiplexing drive.

Comparative Examples 1–6

Liquid crystal cells were prepared and evaluated in the same manner as in Example 1 except for the use of alignment films formed from polymer components shown in Table 3 or commercially available products shown in Table 4 and liquid crystal materials shown in Tables 3 and 4. The measured results of contrast ratio, delay in optical response, and homogeneity of alignment (for Comparative Examples 1 and 2 only) are inclusively shown in Table 5.

As a result, Comparative Examples 3–6 provided liquid crystal devices showing a lower contrast and causing after image. Comparative Examples 1–2 provided liquid crystal devices showing and some irregularity in alignment and contrast for large area devices.

TABLE 3

| Comp. Ex. | Polymer component of alignment film | (wt. parts) | L.C. material |
|---|---|---|---|
| 1 | [structure: polyamide with CF$_3$ groups] | 10 | "CS-1014" |
| | Polyamide of formula (1) R$_1$ = CF$_3$ R$_2$ = CF$_3$ | 90 | |
| 2 | [structure: naphthalene diimide with bisphenol containing CF$_3$ groups] | 50 | "CS-1014" |

TABLE 3-continued

| Comp. Ex. | Polymer component of alignment film | (wt. parts) | L.C. material |
|---|---|---|---|
| | (structure shown) | | 50 |

TABLE 4

| Comp. Ex. | Alignment film material (polyamide acid varnish) | L.C. material |
|---|---|---|
| 3 | "SP-700" (trade name) (mfd. by Toray K.K.; Aromatic polyimide-forming varnish) | "CS-1014" |
| 4 | "SP-700" (trade name) (mfd. by Toray K.K.; Aromatic polyimide-forming varnish) | Above-mentioned liquid crystal material (3) |
| 5 | "LQ-5200" (trade name) (mfd. by Hitachi Kasei K.K.; Polyimide-forming varnish) | "CS-1014" |
| 6 | "LQ-5200" (trade name) (mfd. by Hitachi Kasei K.K.; Polyimide-forming varnish) | Above-mentioned liquid crystal material (3) |

TABLE 5

| Comp. Ex. | Contrast ratio | Optical delay time (sec) | Homogeneity in L.C. device |
|---|---|---|---|
| 1 | 6:1 | 1.3 | x |
| 2 | 28:1 | 0.3 | o |
| 3 | 8:1 | 1.5 | |
| 4 | 7:1 | 2.5 | |
| 5 | 10:1 | 1.2 | |
| 6 | 8:1 | 2.2 | |

EXAMPLE 8

Two 1.1 mm-thick glass plates each provided with a 1000 Å-thick ITO film were respectively coated with a 2.5 wt. % solution of a polyamide composite comprising two polyamides of structural formulae (C) and (D) shown below in a weight ratio of 6:4 in a mixture solvent of N-methylpyrrolidone/n-butylcellosolve (=3/1) by spin coating, followed by baking at 200° C. for about 1 hour to form a 300 Å-thick film, which was then rubbed in one direction with a nylon-fiber planted cloth.

plate was superposed thereon so that their rubbing axes were parallel to each other and disposed in the same direction to form a blank cell (panel).

The blank cell was filled with a ferroelectric smectic liquid crystal ("CS-1014") under vacuum and thereafter cooled from isotropic phase in the same manner as in Example 1 to form a liquid crystal cell.

The thus-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photomultiplier. Then, a pulse of 50 μsec and −30 V was applied to the device, and the transmittance (brightest state) at this time was measured in the same manner, whereby the following data were obtained.

Tilt angle $\theta$=about 15 degrees, transmittance in the brightest state=30%, transmittance in the darkest state=1.2%, contrast ratio=25:1.

The delay in optical response causing after-image was at most 0.3 sec.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and $\Delta T$=20–70 μsec.

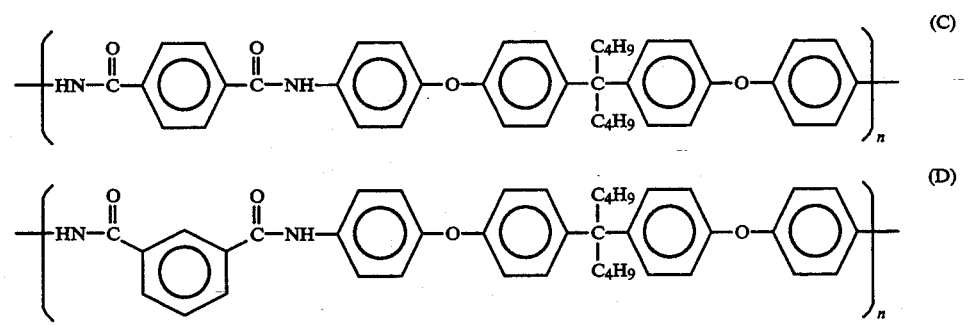

On one of the two glass plates thus treated, 1.5 μm-dia. alumina beads were dispersed, and the other glass

EXAMPLE 9

A liquid crystal cell was prepared in the same manner as in Example 8 except that the alignment films were formed from a polyamide composite comprising two polyamides of structural formulae (E) and (F) shown below in a weight ratio of 7:3.

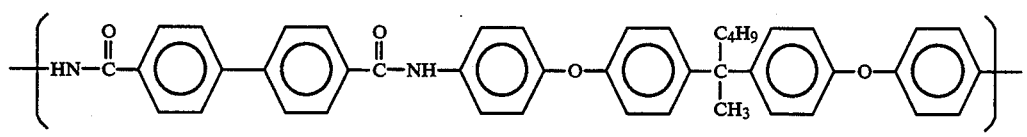

(E)

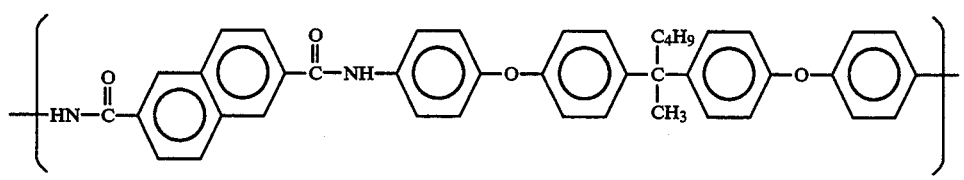

(F)

As a result of measurement in the same manner as in Example 8, the contrast ratio was 20:1 and the delay time in optical response was 0.2 sec. Further, as a multiplexing drive in the same manner as in Example 8, similarly good results were obtained with respect to contrast and after-image.

EXAMPLE 10

A liquid crystal cell was prepared in the same manner as in Example 8 except that the alignment films were formed from a polyamide composite comprising three polyamides of structural formulae (C) (G) and (H) shown below in weight ratios of 4:3:3.

time in optical response was 0.3 sec. Further, as a multiplexing drive in the same manner as in Example 8, similarly good results were obtained with respect to contrast and after-image.

Comparative Example 7

A liquid crystal cell was prepared in the same manner as in Example 8 except that the alignment films were formed from a single polyamide of structural formula (C) shown below:

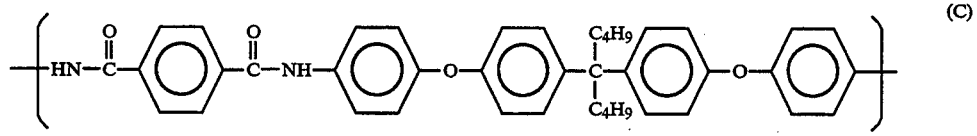

(C)

As a result of measurement in the same manner as in Example 8, the contrast ratio was 14:1 and the delay time in optical response was 1.7 sec. As a result of multiplexing drive in the same manner as in Example 8, a contrast was lower than in Example 8 and an after-image was recognizable.

Comparative Example 8

A liquid crystal cell was prepared in the same manner as in Example 8 except that the alignment films were

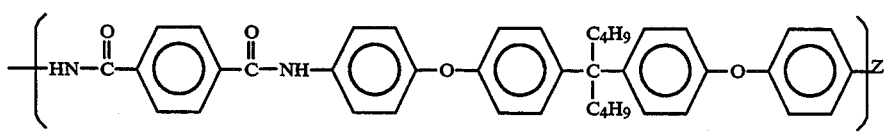

(C)

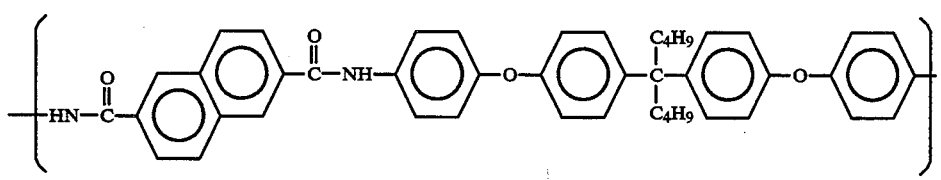

(G)

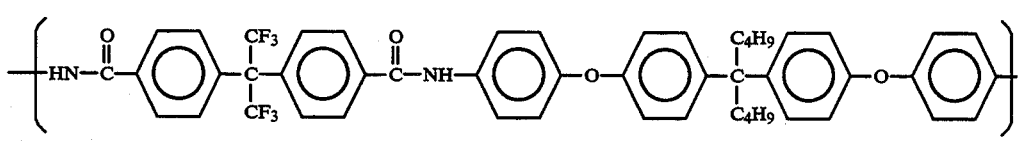

(H)

As a result of measurement in the same manner as in Example 8, the contrast ratio was 23:1 and the delay formed from a composite polyamide of structural formulae (I) and (J) shown below in a ratio of 6:4:

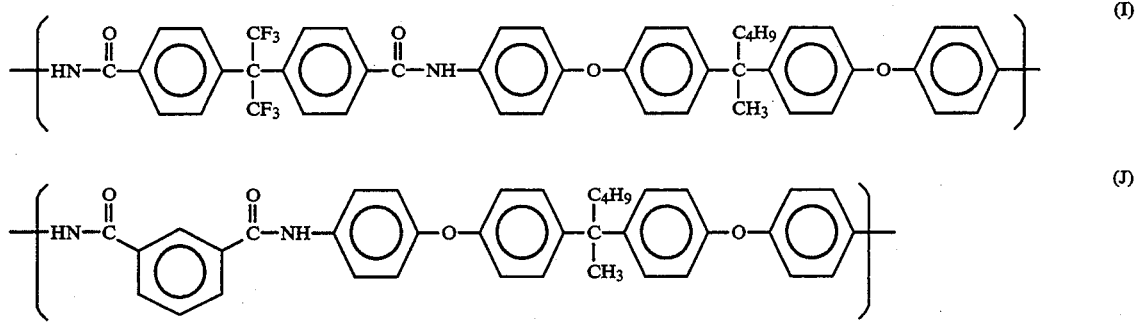

AS a result of measurement in the same manner as in Example 8, the contrast ratio was 6:1 and the delay time in optical response was 1.9 sec. As a result of multiplexing drive in the same manner as in Example 8, a contrast was lower than in Example 8 and an after-image was recognizable.

Comparative Example 9

A liquid crystal cell was prepared in the same manner as in Example 8 except that the alignment films were formed from a composite polyamide acid of structural formulae (K) and (L) shown below in a ratio of 1:1 and the baking temperature was charged to 270° C.:

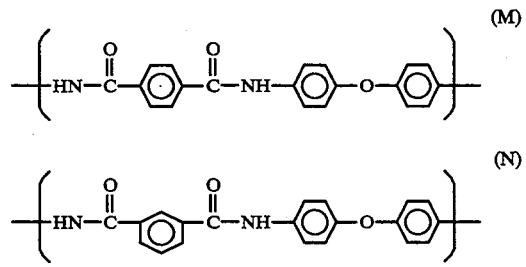

As a result of measurement in the same manner as in

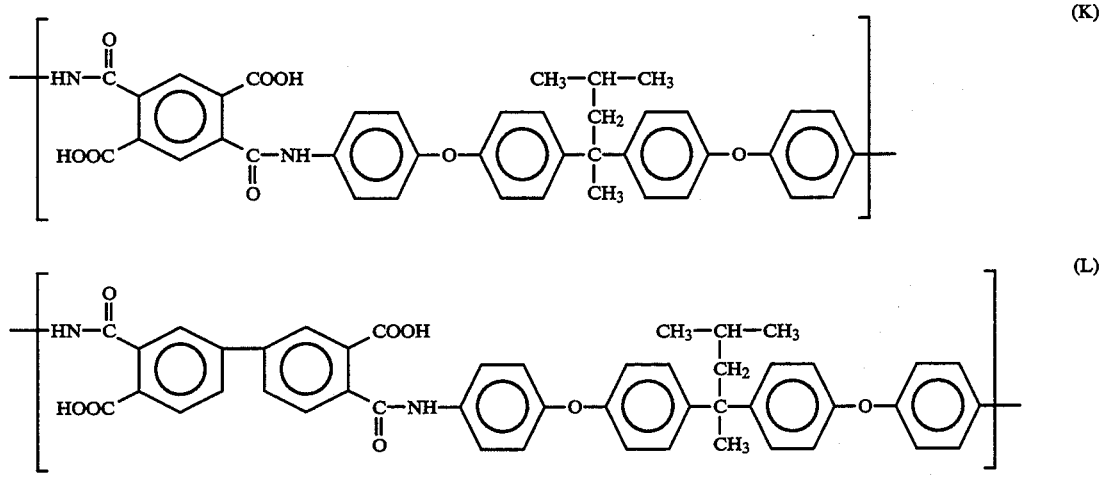

As a result of measurement in the same manner as in Example 8, the contrast ratio was 50:1 and the delay time in optical response was 0.2 sec. As a result of multiplexing drive in the same manner as in Example 8, similarly good results were obtained with respect to contrast and after-image. However, in order to obtain such results, a high baking temperature of at least 250° C. was required for imidation.

Comparative Example 10

A liquid crystal cell was prepared in the same manner as in Example 8 except that the alignment films were formed from a composite polyamide of structural formulas (M) and (N) shown below in a ratio of 6:4:

Example 8, the contrast ratio was 5:1 and the delay time in optical response was 3.0 sec. As a result of multiplexing drive in the same manner as in Example 8, a contrast was lower than in Example 8 and an after-image was recognizable.

EXAMPLE 11

Two 1.1 mm-thick glass plates each provided with a 1000 Å-thick ITO film were respectively coated with a 3.0 wt. % solution of a polyamide composite comprising two polyamides of structural formulae (O) and (P) shown below in a weight ratio of 60:40 in a mixture solvent of N-methylpyrrolidone/n-butylcellosolve (=2/1) by spin coating, followed by baking at 220° C. of about 1 hour to form a 300 Å-thick film, which has then rubbed in one direction with a nylon-fiber planted cloth.

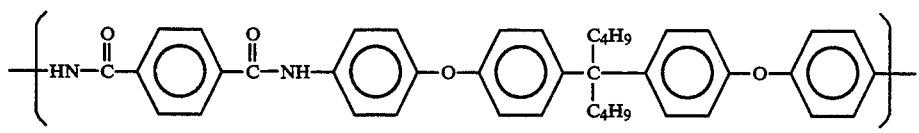

(O)

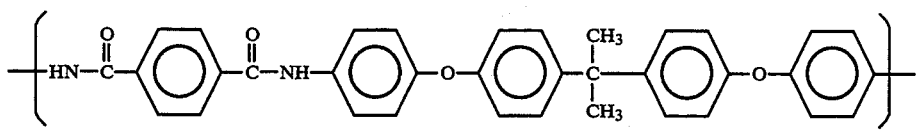

(P)

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a ferroelectric smectic liquid crystal ("CS-1014") under vacuum and thereafter cooled from isotropic phase in the same manner as in Example 1 to form a liquid crystal cell.

The thus-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photomultiplier. Then, a pulse of 50 μsec and −30 V was applied to the device, and the transmittance (brightest state) at this time was measured in the same manner, whereby the following data were obtained.

Tilt angle θ=about 15 degrees, transmittance in the brightest state=38%, transmittance in the darkest state=1.2%, contrast ratio=32:1.

The delay in optical response causing after-image was at most 0.3 sec.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5-8 volts and $\Delta T$=20-70 μsec.

EXAMPLE 12

A liquid crystal cell was prepared in the same manner as in Example 11 except that the alignment films were formed from a polyamide composite of structural formulae (Q) and (R) shown below in a ratio of 70:30.

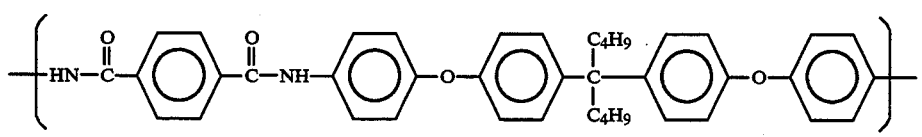

(Q)

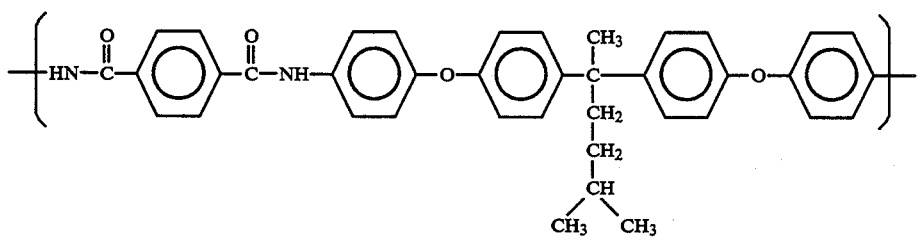

(R)

As a result of measurement in the same manner as in Example 11, the contrast ratio was 25:1 and the delay time in optical response was 0.2 sec. Further, as a multiplexing drive in the same manner as in Example 11, similarly good results were obtained with respect to contrast and after-image.

EXAMPLE 13

A liquid crystal cell was prepared in the same manner as in Example 11 except that the alignment films were formed from a polyamide composite of structural formulae (S) and (T) shown below in a ratio of 1:1.

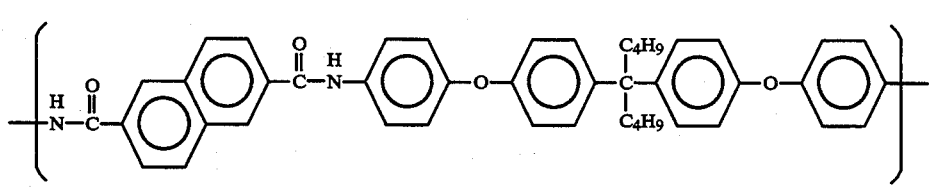

(S)

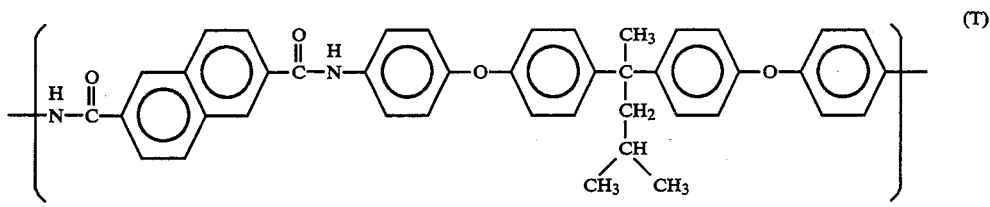

As a result of measurement in the same manner as in Example 11, the contrast ratio was 22:1 and the delay time in optical response was 0.4 sec. Further, as a multiplexing drive in the same manner as in Example 11, similarly good results were obtained with respect to contrast and after-image.

Comparative Example 11

A liquid crystal cell was prepared in the same manner as in Example 11 except that the alignment films were formed from a single polyamide of structural formula (U) shown below:

Comparative Example 12

A liquid crystal cell was prepared in the same manner as in Example 11 except that the alignment films were formed from a composite polyamide of structural formulae (V) and (W) shown below in a ratio of 60:40:

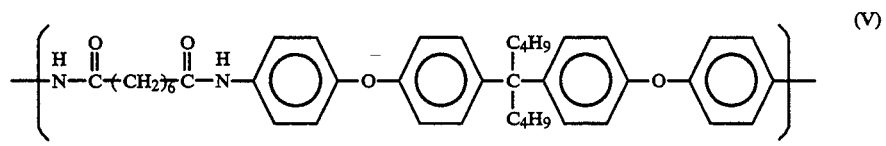

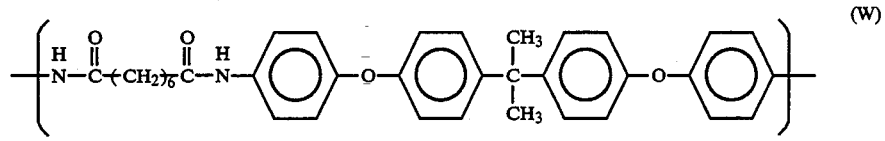

As a result of measurement in the same manner as in Example 11, the contrast ratio was 6:1 and the delay time in optical response was 2.3 sec. As a result of multiplexing drive in the same manner as in Example 11, a contrast was lower than in Example 11 and an after-image was recognizable.

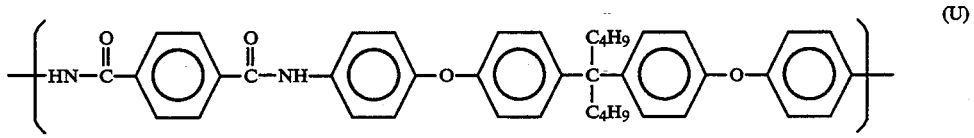

As a result of measurement in the same manner as in Example 11, the contrast ratio was 14:1 and the delay time in optical response was 1.7 sec. As a result of multiplexing drive in the same manner as in Example 11, a contrast was lower than in Example 11 and an after-image was recognizable.

Comparative Example 13

A liquid crystal cell was prepared in the same manner as in Example 11 except that the alignment films were formed from a composite polyamide acid of structural formulae (X) and (Y) shown below in a ratio of 1:1 and the baking temperature was charged to 270° C.:

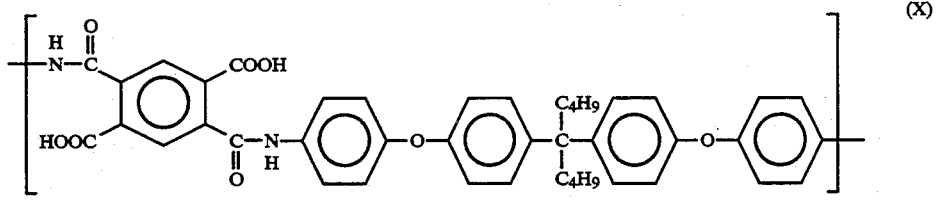

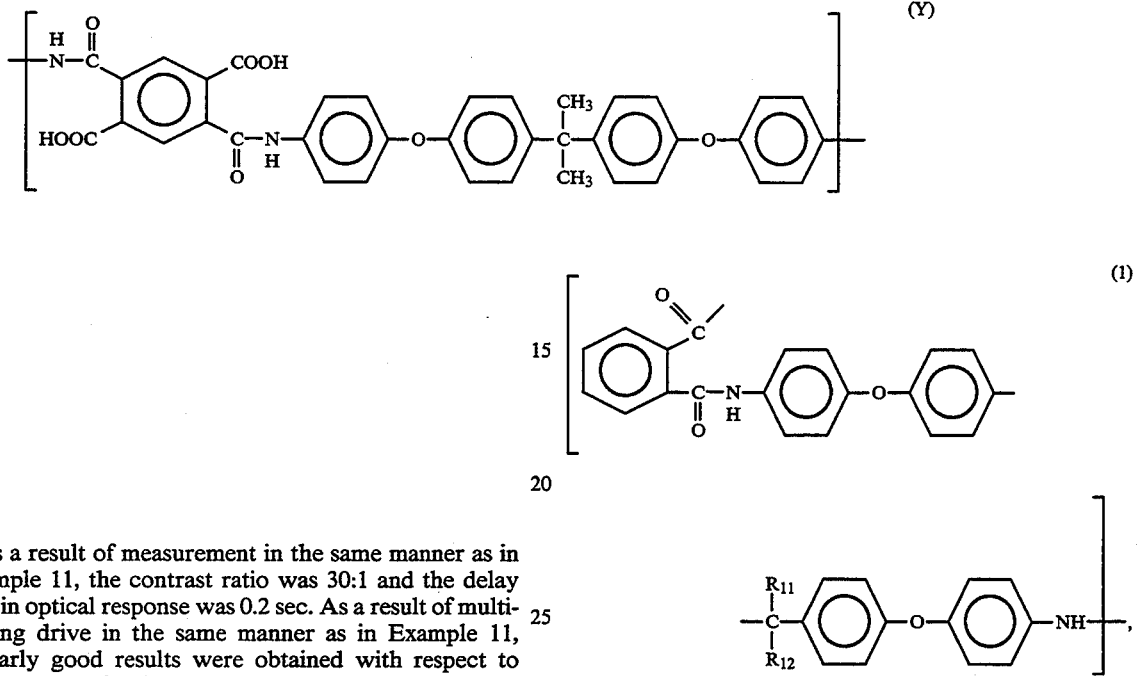

As a result of measurement in the same manner as in Example 11, the contrast ratio was 30:1 and the delay time in optical response was 0.2 sec. As a result of multiplexing drive in the same manner as in Example 11, similarly good results were obtained with respect to contrast and after-image. However, in order to obtain such results, a high baking temperature of at least 250° C. was required for imidation.

Comparative Example 14

A liquid crystal cell was prepared in the same manner as in Example 11 except that the alignment films were formed from a composite polyamide of structural formulae (Z1) and (Z2) shown below:

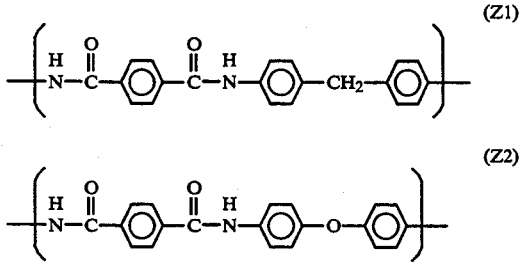

As a result of measurement in the same manner as in Example 11, the contrast ratio was 5:1 and the delay time in optical response was 3.2 sec. As a result of multiplexing drive in the same manner as in Example 11, a contrast was lower than in Example 11 and an after-image was recognizable.

As described above, according to the present invention, it is possible to provide a liquid crystal device which provides a high contrast between the bright and dark states, a large tilt angle θ of a chiral smectic liquid crystal in a non-helical structure and a high-quality display stably showing two states of a high contrast and free from ugly after-image even in a large display area.

What is claimed is:

1. A liquid crystal device, comprising: a pair of substrates and a liquid crystal disposed between the substrates; at least one of said pair of substrates having thereon an alignment film of a polymer composite comprising at least two polymer components including a polyamide represented by a structural unit of the following formula (1):

wherein $R_{11}$ and $R_{12}$ independently denote an alkyl group having 1–10 carbon atoms or a fluoroalkyl group having 1–10 carbon atoms.

2. A liquid crystal device according to claim 1, wherein said polymer composite comprises at most 80 wt. % of the polyamide represented by the formula (1).

3. A liquid crystal device according to claim 1, wherein said liquid crystal is a chiral smectic liquid crystal.

4. A liquid crystal device according to claim 3, wherein said chiral smectic liquid crystal develops smectic A phase and cholesteric phase successively on temperature increase above its chiral smectic temperature range and is placed in chiral smectic C phase by cooling from the cholesteric phase.

5. A liquid crystal device according to claim 4, wherein said liquid crystal shows a helical pitch of at least 0.8 μm in cholesteric phase as measured at a mid temperature in the cholesteric range.

6. A liquid crystal device according to claim 3, wherein said chiral smectic liquid crystal is disposed in a layer in which its helical structure is suppressed.

7. A liquid crystal device according to claim 1, wherein said liquid crystal is a ferroelectric chiral smectic liquid crystal.

8. A liquid crystal device according to claim 1, wherein said at least two polymer components further include a polyamide.

9. A liquid crystal device according to claim 1, wherein said at least two polymer components further include a polyimide.

10. A liquid crystal device according to claim 1, wherein said at least two polymer components further include a polyamideimide.

11. A liquid crystal device according to claim 1, wherein $R_{11}$ and $R_{12}$ are both $CF_3$.

12. A liquid crystal device according to claim 1, wherein both of said pair of substrates have thereon said alignment film and wherein both of said alignment films have been rubbed.

* * * * *

UNITED STATES PATENT AND TRADEMARK OFFICE
CERTIFICATE OF CORRECTION

PATENT NO. : 5,419,931        Page 1 of 3

DATED      : May 30, 1995

INVENTOR   : MASANOBU ASAOKA, ET AL.

It is certified that errors appear in the above-identified patent and that said Letters Patent is hereby corrected as shown below: On the title page, item

AT [30] - FAPD

"Sep. 18, 1993" should read --Sep. 18, 1992-- (both occurrences)

COLUMN 4

Line 1, "acid originated" should read --acid-originated--

Line 9, "$\begin{array}{c} R_{41} \\ C \\ R_{42} \end{array}$" should read $\begin{array}{c} --R_{41} \\ | \\ C \\ | \\ R_{42}-- \end{array}$

COLUMN 5

Line 50, "pyrommelitic" should read --pyromellitic--.

COLUMN 6

Line 9, "dicylofluoropentane." should read --dicyclofluoropentane.--.

UNITED STATES PATENT AND TRADEMARK OFFICE
CERTIFICATE OF CORRECTION

PATENT NO. : 5,419,931

DATED : May 30, 1995

INVENTORS : MASANOBU ASAOKA, ET AL.

It is certified that errors appear in the above-identified patent and that said Letters Patent is hereby corrected as shown below:

COLUMN 8

Line 15, "tadicane," should read --tadecane,--.

COLUMN 9

Line 13, "[B]and" should read --[B] and--.

Line 59, "moment" should read --moments--.

COLUMN 10

Line 47, "cone 54." should read --cone 53.--.

Line 59, "l" and italics should be deleted.

COLUMN 12

Line 36, "4X104" should read --$4 \times 10^4$ and "respectively" should read --respectively,--.

Line 56, "coating films" should read --coated films--.

COLUMN 16

Line 49, "and" should be deleted.

UNITED STATES PATENT AND TRADEMARK OFFICE
CERTIFICATE OF CORRECTION

PATENT NO. : 5,419,931

DATED : May 30, 1995

INVENTOR : MASANOBU ASAOKA, ET AL.

It is certified that errors appear in the above-identified patent and that said Letters Patent is hereby corrected as shown below:

<u>COLUMN 19</u>

Line 43, "(C)" should read (C),--.

Line 48, "Z" should be deleted.

<u>COLUMN 21</u>

Line 16, "AS" should read --As--.

Line 68, "mulas" should read --mulae--.

<u>COLUMN 24</u>

Line 19, "date" should read --data--.

<u>COLUMN 26</u>

Line 57, "charged" should read --changed--.

Signed and Sealed this

Seventeenth Day of October, 1995

Attest:

BRUCE LEHMAN

*Attesting Officer*  *Commissioner of Patents and Trademarks*